April 7, 1953 C. A. THOMAS 2,634,187
MILK COOLING ARRANGEMENT
Filed Aug. 17, 1950 5 Sheets-Sheet 1
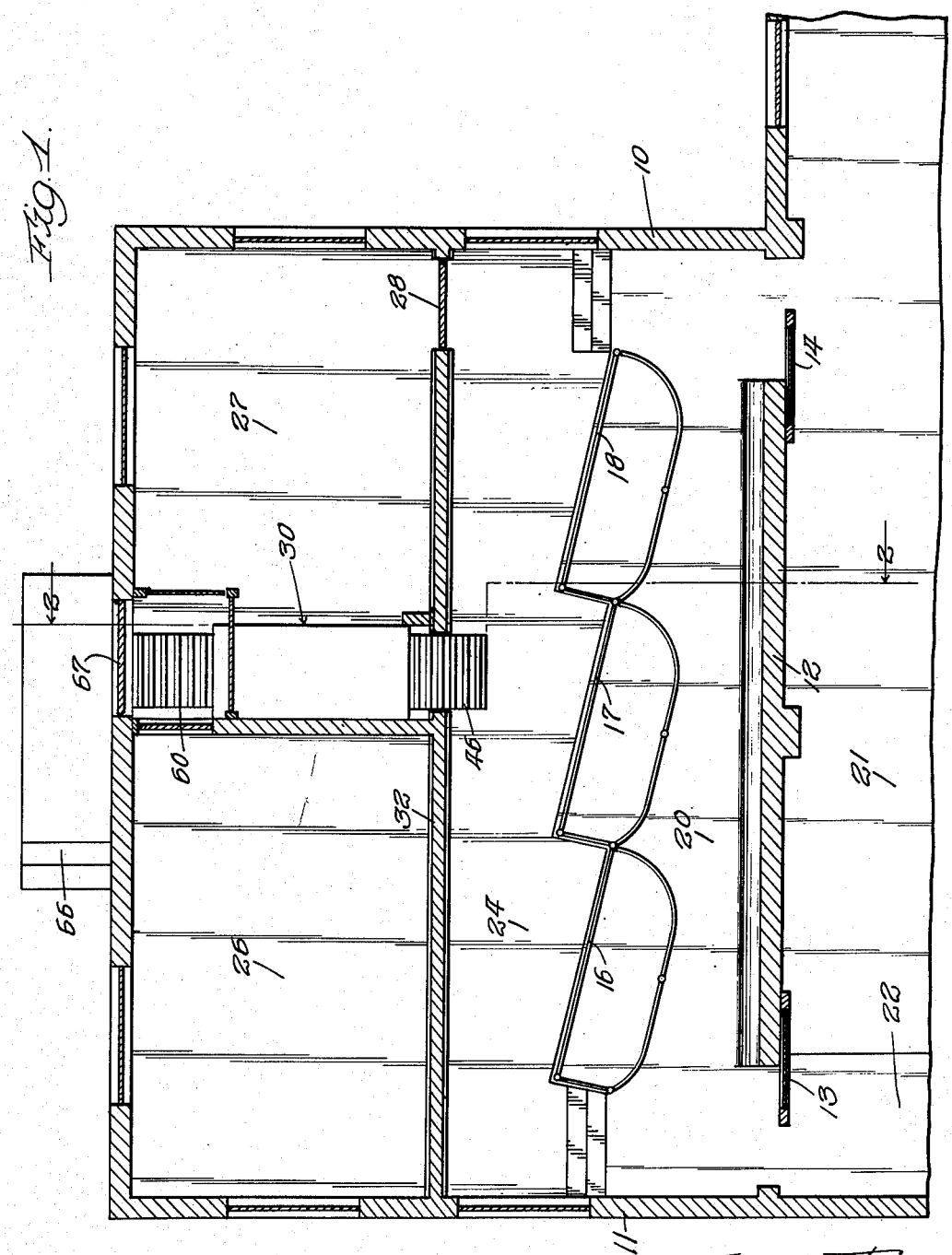
Inventor:
Chester A. Thomas,
By Schroeder, Merriam,
Hofgren & Brady, Attys.

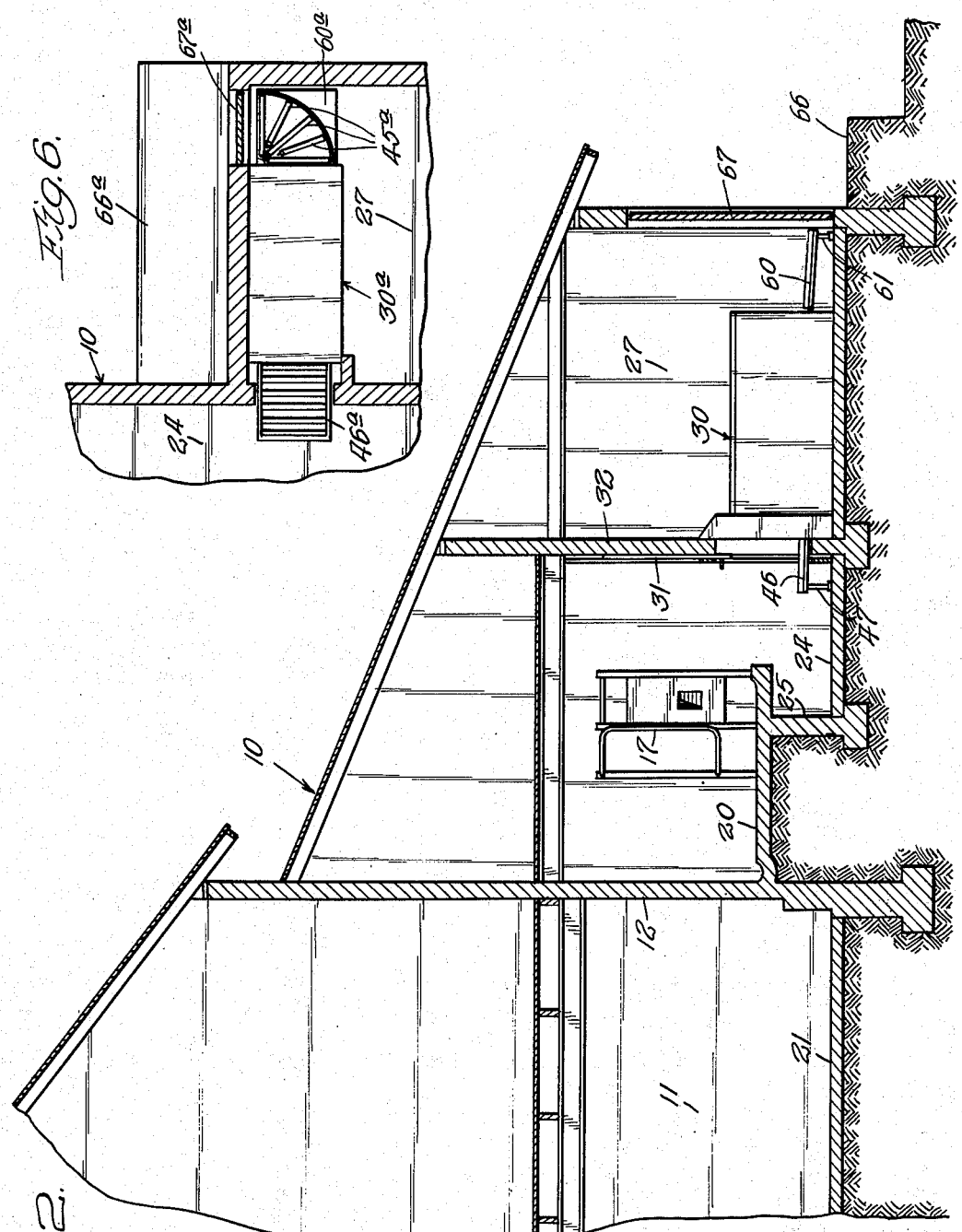

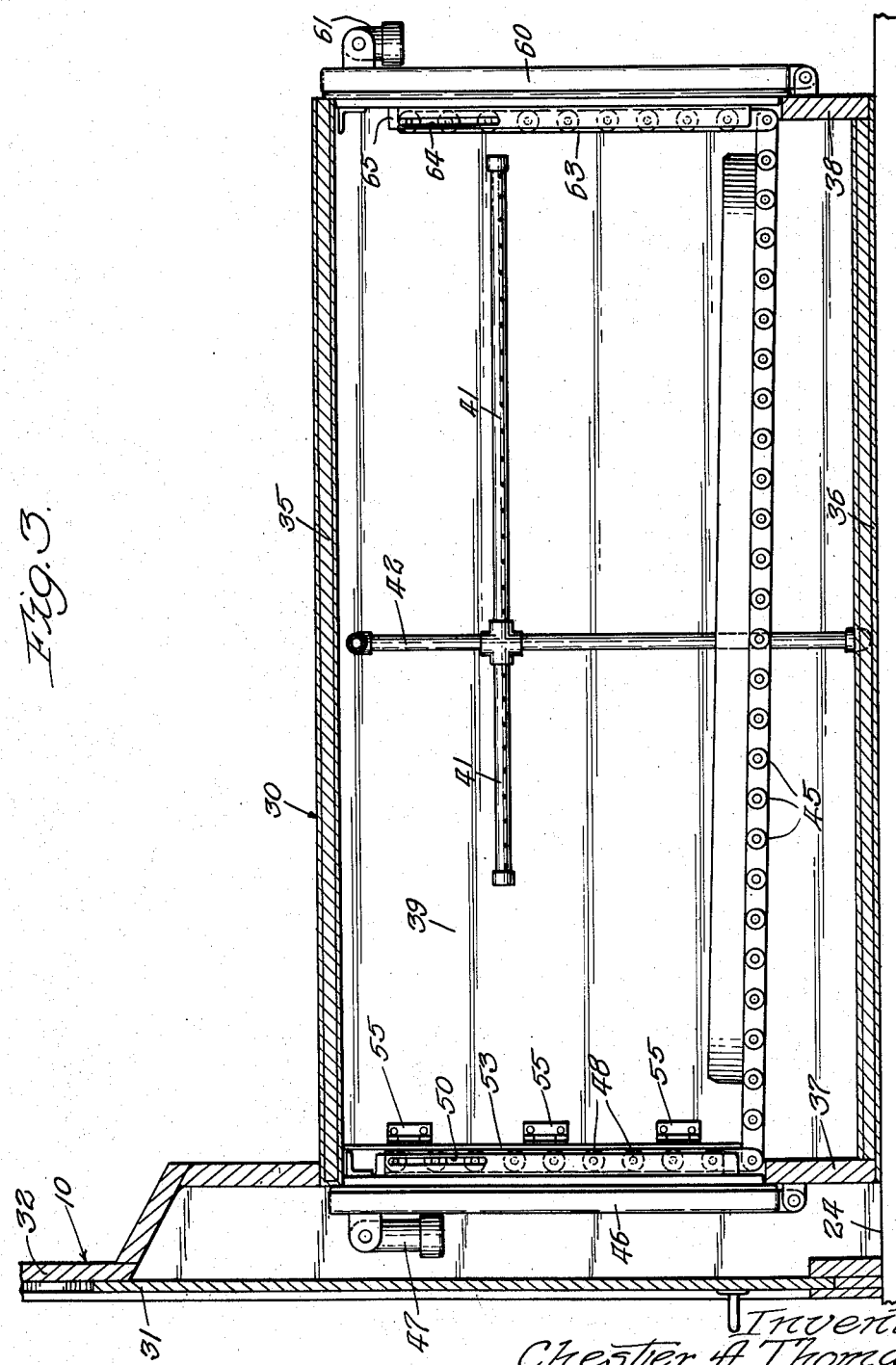

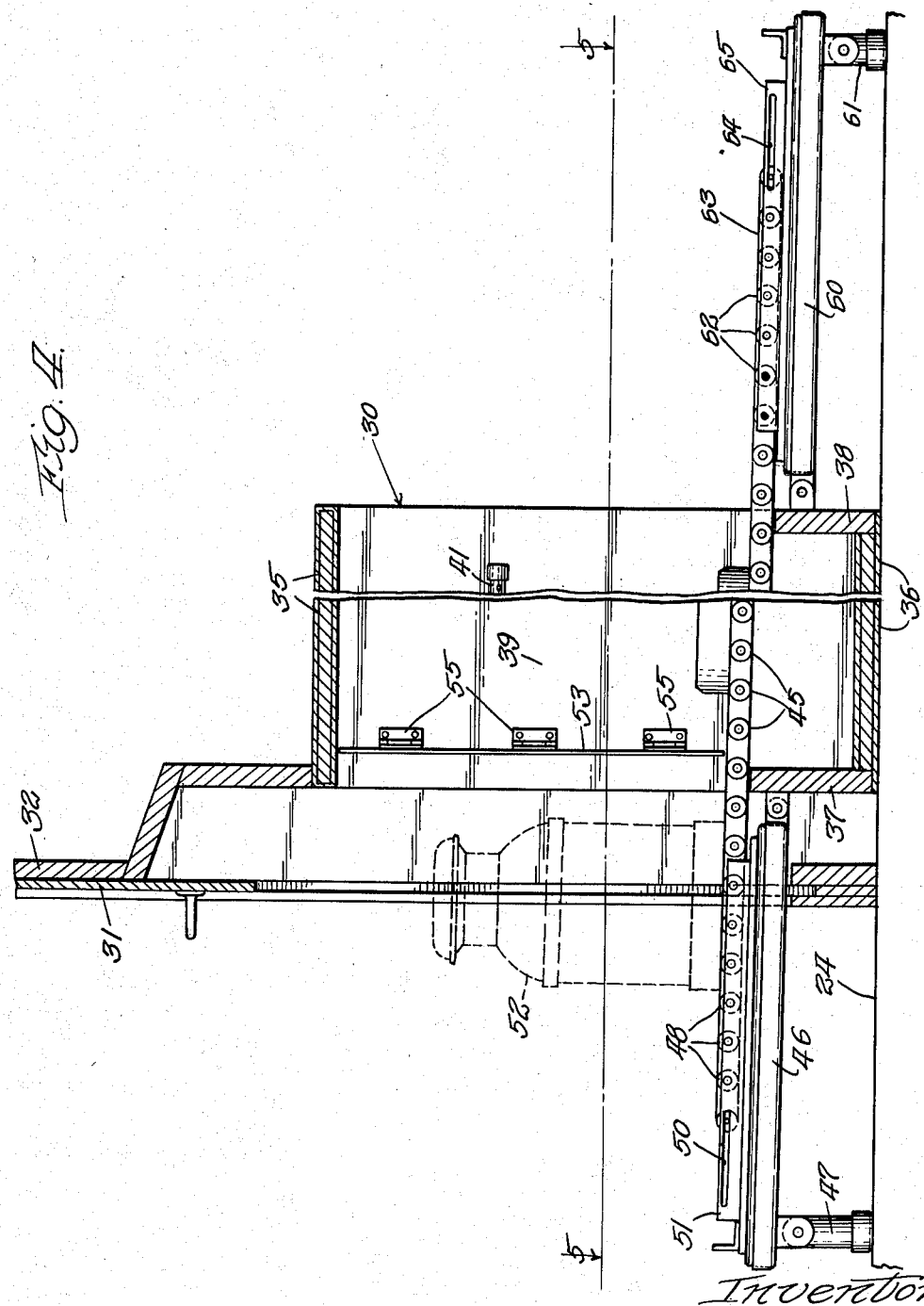

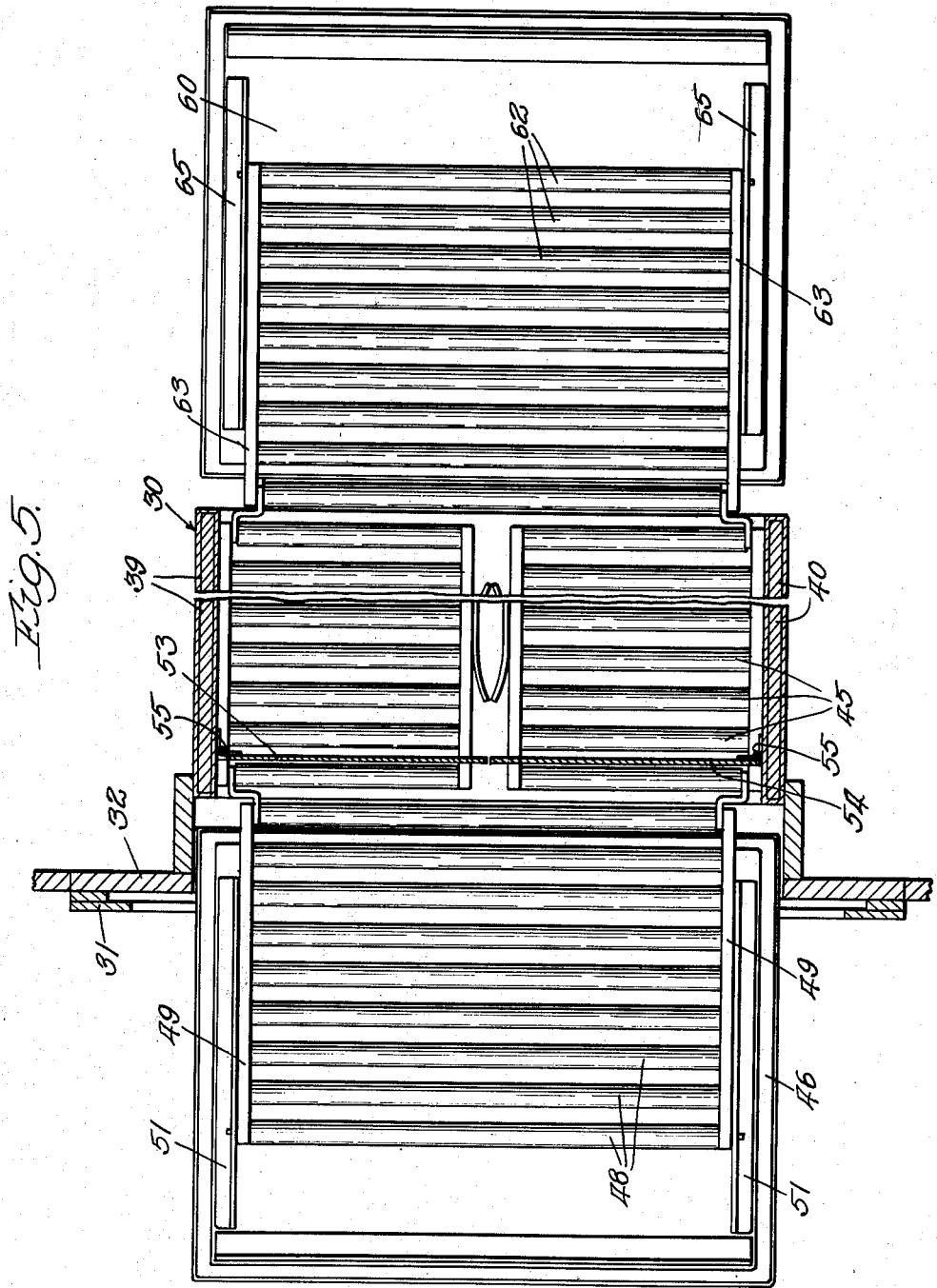

Patented Apr. 7, 1953

2,634,187

UNITED STATES PATENT OFFICE 2,634,187

MILK COOLING ARRANGEMENT

Chester A. Thomas, Lake Forest, Ill., assignor to Babson Bros. Co., a corporation of Illinois Application August 17, 1950, Serial No. 180,000

7 Claims. (Cl. 312—236)

This invention relates to a milk cooling arrangement, and more particularly to a milk can cooling arrangement especially adapted for use in connection with a milking parlor.

Inasmuch as dairy farms are usually located some distance from the milk processing plant, the dairy farmer is confronted with the problem of keeping his milk cool between the time of milking and the time when the milk is picked up for delivery to the plant. Usually the milk is picked up from the farm to be delivered to the plant once a day, but since these pickup routes are necessarily long, it is not possible for each farmer to arrange to have the milk picked up immediately after milking; and the milk from a preceding milking must always be carried over at least ten or twelve hours.

In the past, efforts were made to keep the milk cool by providing "immersion" water tanks and by pumping water into the tanks from the well on the farm, or by providing water cooling means using mechanical refrigeration equipment. This system had disadvantages, particularly in much unnecessary labor in lifting the cans into and out of the tank.

In more recent years refrigerated cabinets have been designed for cooling milk cans. It has been found that in order to provide a margin of safety in the control of bacteria, the milk should be cooled to a temperature below 50° F. within one hour after milking, and instead of placing the milk can in a cold water bath, arrangements have been devised to subject the entire can to a uniformly distributed spray of cold water.

Even with cooling cabinets of this type there have been disadvantages in the way of handling, since it was necessary to carry the milk can out of the milking parlor to the cabinet, put it in, and subsequently remove it through the same door and carry it to the pickup truck.

The present invention provides a novel and improved arrangement including a cabinet having means for cooling milk cans therein and having doors in two different sides of the cabinet so that milk cans may be placed in the cabinet from one side and removed from the cabinet from another side. This improved cabinet may be placed with the side having the entry door adjacent a movable panel in the wall of the milking parlor. A can may be filled with milk and then be placed in the cabinet without the necessity of carrying the can out of the milking parlor, and the improved cabinet includes means for facilitating movement of milk cans to the removal door from the entry door so that cans may readily be loaded from the cabinet onto a delivery truck, thereby reducing to a minimum the amount of time and labor involved in handling the milk cans.

One feature of the invention is that it provides an improved milk can cooling arrangement; another feature of the invention is that it provides a cooling cabinet having an outer entry door in one side adapted to provide an opening for placing milk cans therein and an outer removal door in another side adapted to provide an opening for removing milk cans therefrom; a further feature of the invention is that means are provided in the cabinet for facilitating movement of the milk cans from the entry door to the removal door; yet another feature of the invention is that the entry door may open into the milking parlor and may provide a substantially horizontal platform for milk cans to facilitate loading the cans into the cabinet; yet a further feature of the invention is that the removal door may open to provide a substantially horizontal platform for supporting milk cans for readily loading the cans onto a truck; and an additional feature of the invention is that the cabinet is provided with another door or doors hingedly mounted in the opening through which milk cans are delivered to the cabinet, this door being arranged to swing inside the cabinet when actuated by the weight of a milk can entering the cabinet through the opening, but being normally closed to retain cool air in the cabinet even though the main entry door is open.

Other features and advantages of the invention will be apparent from the following specification and from the drawings in which:

Fig. 1 is a fragmentary horizontal section through a barn looking down on the milking parlor and the improved cooling arrangement;

Fig. 2 is a vertical section along the line 2—2 of Fig. 1;

Fig. 3 is an enlarged fragmentary section showing the cooling cabinet in vertical longitudinal section;

Fig. 4 is a section similar to Fig. 3, but with the outer doors of the cabinet open and with most of the body portion of the cabinet broken away;

Fig. 5 is a horizontal section along the line 5—5 of Fig. 4; and

Fig. 6 is a fragmentary section similar to a portion of Fig. 1, showing a modified form of the arrangement.

Referring now more particularly to the drawings, a barn designated generally at 10 may have a main portion 11 (shown only fragmentarily in Figs. 1 and 2) in which the cows are housed and which is blocked off by a wall 12 and sliding doors 13 and 14 from the milking portion of the barn. The milking portion of the barn includes a milking parlor having therein a plurality of stalls 16, 17 and 18 in which cows are penned while they are being milked. As shown in Fig. 2, the milking parlor is provided with a cow floor 20 which is at a higher level than the floor 21 of the main barn portion, and ramps, as the ramp 22 shown in Fig. 1, may be provided to lead the cows from one floor level to another.

For a full disclosure of the details of this portion of the milking arrangement, including the zig-zag arrangement of the stalls, reference may be had to the Babson and Stampen Reissue Patent No. 22,657 of August 7, 1945.

In the milking parlor is an operator's alley portion 23 provided with a floor 24 which is at a lower level than the floor 20. Preferably, the cow floor 20 is undercut to provide a regular wall 25 between the cow portion of the milking parlor and the operator's alley, despite the fact that the stalls are arranged in a zig-zag conformation as shown in Fig. 2. For a fuller description of this arrangement and of a preferred stall construction, reference is had to the patent of Henry B. Babson and Chester A. Thomas which issued on July 26, 1949 as Patent No. 2,477,035.

The milking portion of the barn illustrated also includes a space 26 which may be used as an office, and a space 27 which may be used as the washroom, for washing and storing the milking utensils. In the barn illustrated, there is no direct communication between the milking parlor and the office space 26, but there is a door 28 between the milking parlor and the washroom 27. In many states, it is required by statute that the milking parlor be completely enclosed by imperforate walls.

As shown in Figs. 1 and 2, a portion of the washroom 27 is utilized to house a cooling cabinet designated generally at 30, and the cabinet may be sealed from the milking parlor by a sliding panel 31 in the wall 32 which seals the milking parlor from the washroom 27.

The construction of the cooling cabinet is shown best in Figs. 3, 4 and 5. Referring primarily to these figures, the cabinet illustrated is rectangular in transverse cross-section and has a top 35, a bottom 36 and four sides including a front 37, a rear 38 and opposite sides 39 and 40. The front side 37 of the cabinet may be adjacent the wall 32 and normally is sealed from the interior of the milking parlor by the slidable panel 31 which, when in its lower or closed position forms an imperforate part of the wall 32, and when in its upper position, as shown in Figs. 2 and 4, provides access to the side 37 of the cabinet 30.

The cabinet 30 has means for cooling milk cans therein, here shown as spray pipes 41 having a plurality of spray openings therein for directing a spray of cooling liquid uniformly over the cans. The pipes 41 are connected by means of a header 42 to a fluid supply which may be housed in the bottom of the cabinet and may be cooled by means of refrigerating apparatus outside of the cabinet. A pump may provide pressure for spraying the liquid through the pipes 41. Inasmuch as the particular type of cooling apparatus is not important to the present invention, only the spray pipe (which comprises the actual cooling means) is shown, and reference may be had to Duncan Patent 2,482,579 of September 20, 1949, for a detailed disclosure of one type of cooling apparatus which may be utilized.

Within the cabinet 30 and spaced above the floor 36 is a platform having an anti-friction surface for facilitating movement of milk cans from one end of the cabinet to the other. As shown best in Fig. 3, the platform comprises a plurality of elongated rollers 45 which define a path for movement of milk cans from one end of the cabinet to the other, and which slope downwardly toward the end of the cabinet from which milk cans are to be removed to be loaded for delivery to the processing plant, so that milk cans will move of their own accord under the force of gravity toward the delivery end of the cabinet.

In the side 37 of the cabinet, an outer entry door 46 is hingedly mounted adjacent its bottom edge so that it is adapted to be moved to provide an opening in the side 37 for placing milk cans in the cabinet. As shown in Figs. 4 and 5, the door opens outwardly from the cabinet into the milk parlor, and hingedly mounted legs 47 on the door support the door in a substantially horizontal plane when the door is open to provide a supporting platform for milk cans at the height of the bottom of the opening in the side 37. Preferably, while it is substantially horizontal, the door slopes slightly downwardly toward the cabinet so that milk cans placed on the door when it is in the position of Figs. 4 and 5 may readily be moved into the cabinet. In order to facilitate this movement, the door is provided with a plurality of rollers 48 which are carried in a frame 49 pinned in a slot 50 in guide rails 51 so that the rollers 48 may move as a unit from the position of Fig. 4 to the position of Fig. 3 to permit the door to close. In the operation of the improved milk cooling arrangement, a milk can 52 preferably is placed on the floor 24 of the operator's alley and is filled with milk, after which it is placed on the horizontal platform provided by the open door 46 and moved into the cabinet 30. While it is preferable to fill the can on the floor 24, in order to keep milk from spilling on the inner surface of the door, still the door 46 generally stays open during the entire milking process. In order to prevent loss of the cool air within the cabinet 30, I provide a pair of swinging doors 53 and 54 mounted by means of hinges 55 on the respective side walls 39 and 40 so that the doors 53 and 54 are in the opening in the side 37 and close the opening when they are closed. The hinges preferably are of the spring type to yieldably bias the swinging doors to closed position, and the doors may be swung inwardly into the cabinet 30 when actuated by the weight of a milk can entering the cabinet through the opening in the side 37.

In the opposite side 38 of the cabinet 30, there is mounted an outer removal door 60 which is similar to the entry door 46 and is hinged adjacent its bottom edge and is adapted to be moved to provide an opening in the side 38 to remove milk cans from the cabinet. The door 60 opens outwardly from the cabinet as shown in Figs. 4 and 5 and is provided with hingedly mounted legs 61 for supporting the door in a substantially horizontal plane when it is open to provide a supporting platform for milk cans at the height of the bottom of the opening in the side 38. As shown in Fig. 4, this platform slopes downwardly away from the cabinet to facilitate movement of the cans out to the end of the platform. The door 60 is provided with a plurality of rollers 62 which are mounted in a frame 63 pinned in a slot 64 in rails 65 to provide for movement of the frame 63 between the positions of Figs. 4 and 3 to permit closing the door. As shown in Figs. 1 and 2, the door 60 may open inside the barn and access may be had to a loading platform 66 by opening a door 67. Obviously, if desired, the cabinet 30 may be made of such size that the door 60 opens out of the barn and the legs 61 rest directly on the loading platform.

An arrangement similar to this suggested modification is shown in Fig. 6 where a cabinet 30a is provided with an entry door 46a for receiving milk cans and is provided with a removal door 60a for discharging or delivering milk cans. In this modification, the respective doors 46a and 60a are in sides which extend at right angles to each other rather than being in opposite sides of the cabinet, although the doors are still spaced from each other a distance equal to substantially the entire length of the side of the cabinet 30 which is between the doors. As shown in Fig. 6, near the removal end of the cabinet 30 the rollers 45a are arranged to provide a path of movement for the milk cans having a right angle turn therein so that the cans may emerge from the cabinet onto the platform provided by the door 60a. In order to open the door 60a, it is necessary first to open the door 67a providing access to the loading platform 66a, and the door 60a is provided with a leg to support the open door in a substantially horizontal plane above the loading platform. With this construction, a truck may be backed up to the loading platform and the cans may be moved directly from the door 60a onto the adjacent truck. As in the embodiment of Figs. 1–5, the surface formed by the rollers 45a may be sloped downwardly toward the door 60a so that milk cans may move by gravity from the platform formed by the door 46a through the cabinet 30a and out onto the platform formed by the door 60a.

From the above description it will be seen that my improved milk cooling arrangement makes it possible for the operator in the milking parlor merely to place a filled milk can on the platform provided by the open door 46 and to start the movement of the can into the cabinet 30 so that the can will move past the normally closed doors 53 and 54. The slope provided by the surface of the rollers within the cabinet causes the cans to move towards the outlet door, and when the outlet door 60 is opened, cans may readily be loaded either onto the loading platform 66 or directly into a truck. All intermediate lifting operations heretofore necessary in moving the cans from the milking parlor to a cooler, into the cooler, and then out of the cooler into a truck, are eliminated.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A milk can cooling arrangement of the character described, comprising: a cooling cabinet having means for cooling milk cans therein; entry door means in one side of said cabinet comprising spring hinged door means adapted to provide an opening for placing milk cans therein, whereby said door means swing inside said cabinet when actuated by the weight of a milk can entering said cabinet through said opening, and said spring hinges urge said door means toward closed position; removal door means in another side of said cabinet adapted to provide an opening for removing milk cans therefrom; and means in said cabinet for facilitating movement of milk cans from said entry door means to said removal door means, comprising a plurality of elongated rollers extending generally transversely of the path of movement of said cans between said openings and forming a supporting surface sloping downwardly in the direction of said removal door means.

2. A milk can cooling arrangement of the character described, comprising: a cooling cabinet having means for cooling milk cans therein; first door means in one side of said cabinet adapted to provide an opening for placing milk cans therein, said door means including an entry door opening outwardly from said cabinet and a spring hinged door opening into said cabinet, said door swinging inside said cabinet when actuated by the weight of a milk can entering said cabinet through said opening, said spring hinges urging said door toward closed position; and removal door means in another side of said cabinet adapted to provide an opening for removing milk cans therefrom.

3. A milk can cooling arrangement of the character described, comprising: a cooling cabinet having means for cooling milk cans therein; an entry door hingedly mounted adjacent its bottom edge in one side of said cabinet, and adapted to provide an opening in said side for placing milk cans in said cabinet, said door opening outwardly from said cabinet; means for supporting said door in a substantially horizontal plane when said door is open to provide a supporting platform for milk cans; a second door hingedly mounted in said opening and arranged to swing inside said cabinet when actuated by the weight of a milk can entering said cabinet through said opening; and means for yieldably biasing said second door to closed position.

4. A milk can cooling arrangement of the character described, comprising: a cooling cabinet having means for cooling milk cans therein; an entry door hingedly mounted adjacent its bottom edge in one side of said cabinet, and adapted to provide an opening in said side for placing milk cans in said cabinet, said door opening outwardly from said cabinet; means for supporting said door in a substantially horizontal plane when said door is open to provide a supporting platform for milk cans, a pair of swinging doors hingedly mounted on opposite sides of said opening and arranged to swing inside said cabinet when actuated by the weight of a milk can entering said cabinet through said opening, said swinging doors closing said opening when they are closed; and means for yieldably biasing said swinging doors to closed position.

5. A milk can cooling arrangement of the character described, comprising: a cooling cabinet having means for cooling milk cans therein; an outer entry door hingedly mounted adjacent its bottom edge in one side of said cabinet and adapted to provide an opening in said side for placing milk cans in said cabinet, said door opening outwardly from said cabinet; means on said door for supporting said door in a substantially horizontal plane when said door is open to provide a supporting platform for milk cans at the height of the bottom of said opening; at least one swinging door hingedly mounted in said opening and arranged to swing inside said cabinet when actuated by the weight of a milk can entering said cabinet through said opening, said swinging door closing said opening when it is closed;

means for yieldably biasing said swinging door to closed position; an outer removal door hingedly mounted adjacent its bottom edge in another side of said cabinet and adapted to provide an opening in said other side for removing milk cans from said cabinet, said removal outer door opening outwardly from said cabinet; means on said removal door for supporting said door in a substantially horizontal plane when said removal door is open to provide a supporting platform for milk cans at the height of the bottom of said last mentioned opening; and means in said cabinet for causing movement of milk cans from said entry door to said removal door, comprising a plurality of elongated rollers extending generally transversely of the path of movement of said cans between said openings and forming a supporting surface sloping downwardly in the direction of said removal door.

6. In a milking system having a wall-enclosed milking parlor, a milk can cooling arrangement of the character described, comprising: a cooling cabinet having means for cooling milk cans therein, said cabinet being positioned outside the milking parlor and having one side adjacent a wall thereof; a slidable panel in said wall providing access to said cabinet; an entry door hingedly mounted adjacent its bottom edge in said side of said cabinet opposite said panel, said door being adapted to open into said parlor to provide an opening for placing milk cans in said cabinet; means for supporting said door in a substantially horizontal plane when said door is open to provide a supporting platform for milk cans at the height of the bottom of said opening; a removal door hingedly mounted in another side of said cabinet and adapted to provide an opening for removing milk cans therefrom; and means in said cabinet for facilitating movement of milk cans from said entry door to said removal door comprising a platform having an anti-friction surface sloping downwardly in the direction of said removal door.

7. A milk can cooling arrangement of the character described, comprising: a rectangular cooling cabinet having means for cooling milk cans therein; an entry door hingedly mounted adjacent its bottom edge in one side of said cabinet and adapted to provide an opening for placing milk cans therein; means on said door for supporting said door in a substantially horizontal plane when said door is open to provide a supporting platform for milk cans at the height of the bottom of said opening; a removal door hingedly mounted adjacent its bottom edge in another side of said cabinet and substantially at a right angle to said entry door, said doors being spaced from each other a distance equal to substantially the entire length of one of said sides; means on said removal door for supporting said door in a substantially horizontal plane when said removal door is open to provide a supporting platform for milk cans at the height of the bottom of said last mentioned opening; and means in said cabinet for causing movement of milk cans from said entry door to said removal door, comprising a plurality of elongated rollers arranged to provide a path of movement for said cans having a right angle turn therein, said rollers extending generally transversely of the path of movement of said cans between said openings and forming a supporting surface sloping downwardly in the direction of said removal door, the direction of movement of the milk cans at the entry door being substantially at a right angle to the direction of movement of the milk cans at the removal door.

CHESTER A. THOMAS.

REFERENCES CITED

The following references are of record in the file of this patent:

UNITED STATES PATENTS

| Number | Name | Date |
|---|---|---|
| 135,440 | Partridge | Feb. 4, 1873 |
| 764,777 | Slater | July 12, 1904 |
| 1,850,514 | Norwood | Mar. 22, 1932 |
| 1,912,827 | Copeman | June 6, 1933 |
| 2,199,097 | Chappelle | Apr. 30, 1940 |
| 2,464,111 | Alexander | Mar. 8, 1949 |
| 2,482,579 | Duncan | Sept. 20, 1949 |
| 2,484,572 | Jude | Oct. 11, 1949 |
| 2,575,094 | Chamberlain | Nov. 13, 1951 |